(12) United States Patent
Melchiorri

(10) Patent No.: US 12,742,497 B2
(45) Date of Patent: Sep. 22, 2026

(54) HYDRAULIC SYSTEM OF A POWER TRANSMISSION, WITH INTEGRATION OF AN ACTUATING FUNCTION AND A LUBRICATING AND/OR COOLING FUNCTION

(71) Applicant: FERRARI S.P.A., Modena (IT)

(72) Inventor: Matteo Melchiorri, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 19/273,256

(22) Filed: Jul. 18, 2025

(65) Prior Publication Data

US 2026/0029027 A1 Jan. 29, 2026

(30) Foreign Application Priority Data

Jul. 23, 2024 (IT) ........................ 102024000017053

(51) Int. Cl.
*F16H 57/04* (2010.01)

(52) U.S. Cl.
CPC ..... *F16H 57/0434* (2013.01); *F16H 57/0435* (2013.01)

(58) Field of Classification Search
CPC ............. F16H 57/0435; F16H 61/0206; F16H 2061/0209; F16H 61/0211
See application file for complete search history.

(56) References Cited

U.S. PATENT DOCUMENTS

| | | | | |
|---|---|---|---|---|
| 5,347,886 A * | 9/1994 | Mainquist | F16H 57/0413 475/159 |
| 5,726,353 A * | 3/1998 | Matsuda | G01L 3/109 180/338 |
| 7,128,688 B2 * | 10/2006 | Katou | F16H 57/0434 192/3.57 |
| 2015/0321553 A1 | 11/2015 | Pritchard et al. | |

(Continued)

FOREIGN PATENT DOCUMENTS

| | | | | |
|---|---|---|---|---|
| DE | 102018114614 A1 | 12/2019 | |
| DE | 102022202853 A1 | 9/2023 | |
| EP | 1674765 A1 * | 6/2006 | F16H 57/0434 |

(Continued)

OTHER PUBLICATIONS

Italian Search Report and Written Opinion in IT Application No. 202400017053, mailed Jan. 28, 2025, an English translation attached hereto (6 pages).

*Primary Examiner* — Stacey A Fluhart
(74) *Attorney, Agent, or Firm* — Leason Ellis LLP

(57) ABSTRACT

A hydraulic system of a power transmission has a reservoir, a pump and, downstream of the latter, a junction point, from which a first and a second branch start; the first branch is configured to perform a cooling and/or lubricating function on a part of the transmission; the second branch performs an actuating function by means of a hydraulic actuator; the system further has a first and a second control valve arranged along the first and the second branch, respectively, and are equal to each other; each of them has a first port connected (Continued)

to the junction point, a second port connected to the reservoir, and a third port; the latter, in the first control valve, supplies the part to be cooled/lubricated and, in the second control valve, communicates with a chamber of the hydraulic actuator for pressurizing such chamber.

9 Claims, 2 Drawing Sheets

(56) References Cited

U.S. PATENT DOCUMENTS

2015/0330493 A1* 11/2015 Pritchard ................ F16H 48/38
475/86
2022/0297537 A1 9/2022 Perry et al.

FOREIGN PATENT DOCUMENTS

JP 2004360905 A * 12/2004 ......... F16H 61/0025
KR 20100110843 A * 10/2010 ........... F16D 25/123

* cited by examiner

HYDRAULIC SYSTEM OF A POWER TRANSMISSION, WITH INTEGRATION OF AN ACTUATING FUNCTION AND A LUBRICATING AND/OR COOLING FUNCTION

CROSS-REFERENCE TO RELATED APPLICATIONS

This patent application claims priority from Italian patent application no. 102024000017053 filed on Jul. 23, 2024, the entire disclosure of which is incorporated herein by reference.

TECHNICAL FIELD

The present invention relates to a hydraulic system of a power transmission, incorporating, together, an actuating function and a lubricating and/or cooling function.

BACKGROUND

As it is known, in power transmissions mounted on vehicles, some parts, such as the bearings and the meshing between pairs of transmission gears, are normally lubricated and/or cooled by means of oil flows, managed by means of a corresponding hydraulic system.

With the purpose to reduce the number of components and, therefore, the overall dimensions and the weights of the power transmissions, the need is felt to integrate, in the hydraulic system, also an actuating function. In other words, the desire is to connect, to the delivery mouth of a same pump, a first hydraulic circuit designed to cool and/or lubricate one or more parts of the transmission, and also a second hydraulic circuit designed to drive a hydraulic actuator, for example a piston, installed on the transmission.

A hydraulic system of this type, which integrates an actuating function and a lubricating/cooling function, is generally already used, for example in some gearboxes for motor vehicles, but the known solutions are anyway relatively complex.

The object of the present invention is thus to provide a hydraulic system of this type, namely a solution that integrates an actuating function and a lubricating/cooling function, but that is relatively simple and cost-effective with respect to the known solutions.

SUMMARY OF THE INVENTION

According to the present invention, a hydraulic system of a power transmission is provided, as defined in the appended claim 1.

At the same time, the appended dependent claims define particular embodiments of the present invention.

BRIEF DESCRIPTION OF THE DRAWINGS

In order to better understand the present invention, preferred embodiments thereof are now described, by way of mere non-limiting example, with reference to the accompanying drawings, wherein.

DESCRIPTION OF PREFERRED EMBODIMENTS

Figure 1:
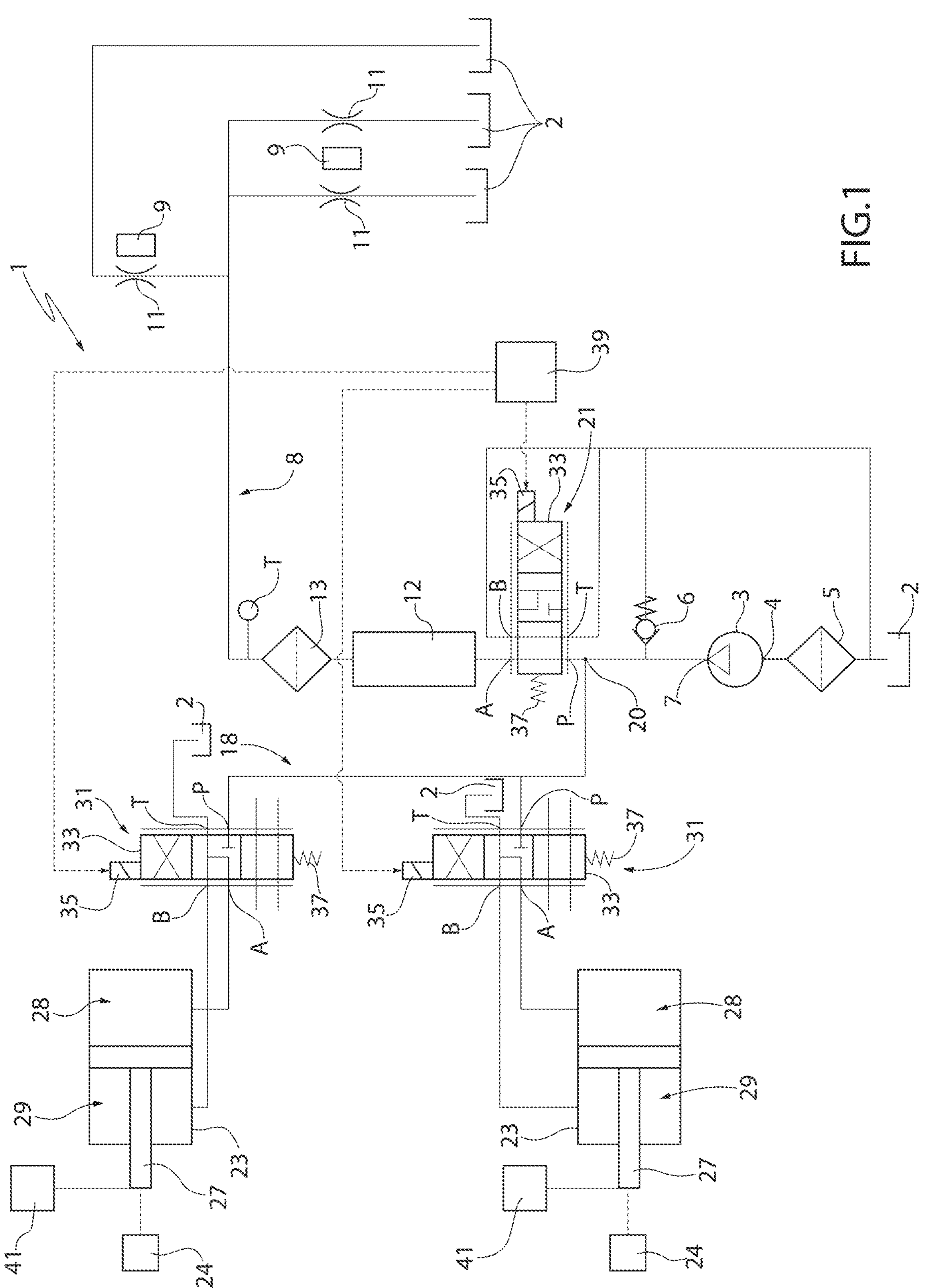
FIG. 1 is a diagram of a preferred embodiment of the hydraulic system according to the present invention.

With reference to what is schematically shown in FIG. 1, reference numeral 1 refers to a hydraulic system forming part of a power transmission, in particular a transmission installed on an electrically driven motor vehicle, not shown.

The hydraulic system 1 comprises a reservoir 2 containing an operating liquid, defined for example by a lubricating oil, and a pump 3 which has a suction mouth 4 communicating with the reservoir 2 (for example by means of a filter 5) for drawing the operating liquid and is driven by an electric motor, not shown, so as to make such operating liquid circulate in the hydraulic system 1. In particular, the hydraulic system 1 comprises one single pump.

The hydraulic system 1 further comprises a pressure limiting valve 6, arranged at, or immediately downstream of, a delivery mouth 7 of the pump 3, for defining the maximum pressure of the operating liquid flow supplied by the pump 3.

The hydraulic system 1 further comprises a first branch, indicated by reference 8, supplied by the delivery mouth 7, and configured to lubricate and/or cool one or more parts 9 (schematically shown) associated with the power transmission. In particular, the parts 9 to be lubricated and/or cooled can be defined by: bearings; meshing zones between transmission gears; electronic and/or electric components which, in use, tend to overheat; etc. . . .

Figure 2:
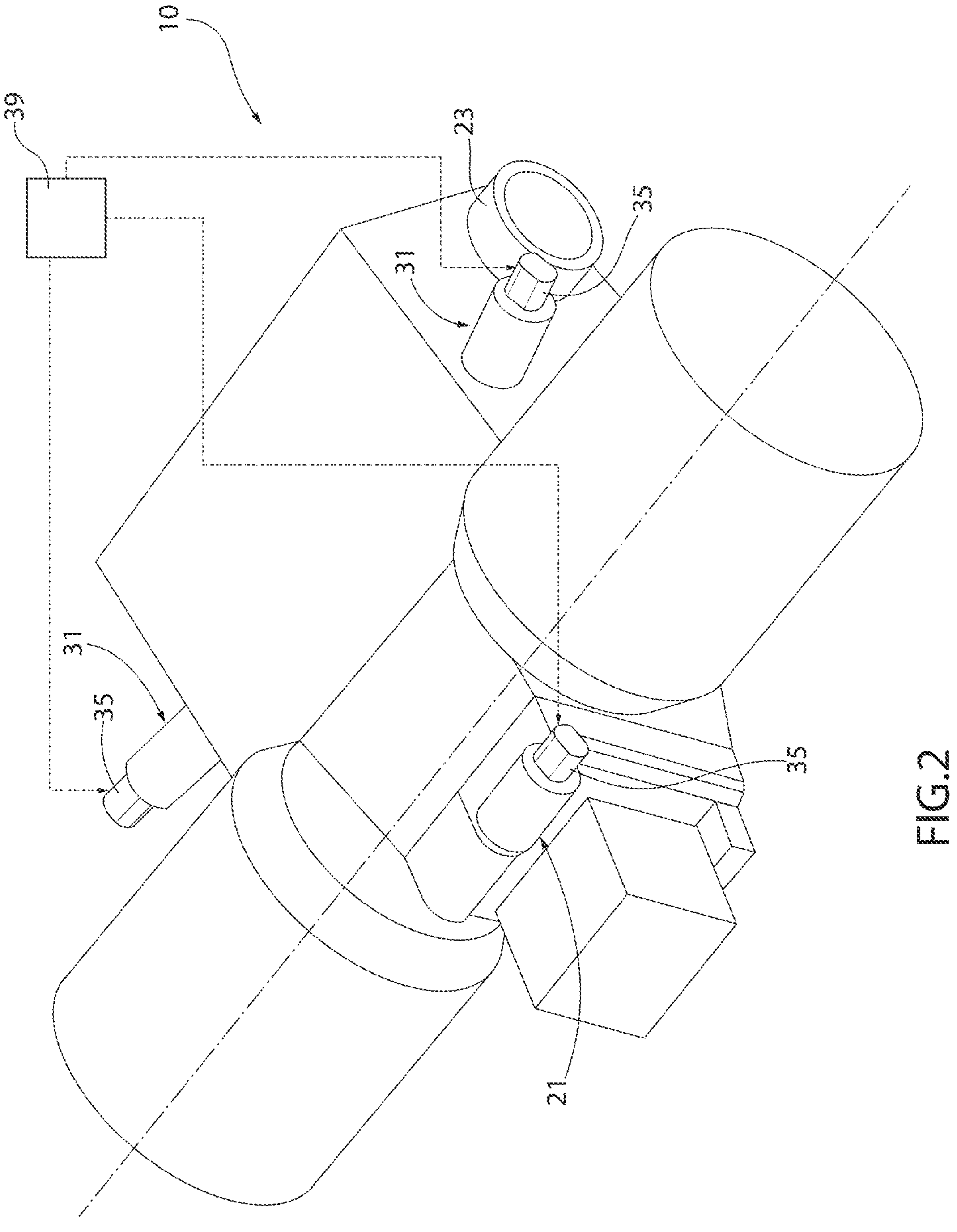
FIG. 2 illustrates, in a simplified manner and in perspective, a rear axle, to which the hydraulic system of FIG. 1 is applied.

More in particular, the power transmission to which reference is made is defined by an axle, for example an electrically driven front axle, illustrated in a simplified manner and identified by reference numeral 10 in FIG. 2.

In greater detail, as shown in FIG. 1, the first branch 8 comprises one or more nozzles 11, schematized as respective hydraulic resistances and configured to deliver the operating liquid towards the parts 9 to be lubricated and/or cooled. The operating liquid delivered by the nozzles 11, after performing its lubricating and/or cooling function, is conveyed towards the reservoir 2 in a schematically shown manner, to then be caused by the pump 3 to recirculate in the hydraulic system 1.

Preferably, the first branch 8 further comprises a heat exchanger 12, arranged upstream of the nozzles 11 and configured to lower the temperature of the operating liquid which flows through the heat exchanger 12, by means of known techniques not described in detail, in order to effectively perform the cooling, when provided for. The thermal exchange in the heat exchanger 12 is preferably adjusted in an automated manner by means of an electronic control unit, not shown, in response to signals emitted by one or more temperature sensors T, arranged so as to detect the temperature of the operating liquid (for example, upstream and downstream of the heat exchanger 12, and/or upstream of the nozzles 11).

Furthermore, the first branch 8 can comprise a filter 13, downstream of the heat exchanger 11 and/or upstream of the temperature sensor T.

According to an aspect of the present invention, the hydraulic system 1 further comprises a second branch, indicated by reference 18, supplied by the delivery mouth 7 of the pump 3 and arranged in parallel with respect to the first branch 8. In other words, the first branch 8 and the second branch 18 start from a same junction point 20 of the hydraulic system 1, downstream of the pressure limiting valve 6. The operating liquid supplied by the pump 3 goes into the first branch 8 or the second branch 18 (or possibly into both) in response to the drive of a control valve 21, arranged along the first branch 8 downstream of the junction point 20 (upstream of the heat exchanger 12, if the latter is provided for). The specific characteristics of the control valve 21 will be described in detail in the following.

The second branch 18 puts the junction point 20 in communication with at least one hydraulic actuator 23, defined for example by a linear actuator, in particular of the double-acting type, so as to drive a movable element 24 (schematically shown) installed on the above-mentioned power transmission.

In the front axle 10 illustrated in FIG. 2 as a non-limiting example, the movable element 24 driven by the hydraulic actuator 23 is an element configured to drive a clutch device (not shown), for example a splined shaft mechanical device. More in detail, the movable element 24 is capable of translating between two operating positions: in one of them, the device is engaged, therefore the front axle 10 transmits torque from an electric motor towards a corresponding wheel (not shown); in the other operating position, the device is disengaged, therefore such wheel is idly rotating.

In particular, the front axle 10 drives a pair of wheels and thus comprises two clutch devices, one for each wheel. Therefore, in this example, as visible in FIG. 1, the second branch 18 actually divides into two sub-branches, in parallel with respect to each other, for putting the junction point 20 in communication with two hydraulic actuators 23, respectively, one for each of the clutch devices. The following discussion will refer, for sake of simplicity, to only one of the hydraulic actuators 23, considering that the configuration is identical for the other one.

The hydraulic actuator 23 comprises a driving member 27, for example a piston rod, coupled to the movable element 24 and driven by the pressure of the operating liquid. In the specific example taken into consideration, as mentioned above, the hydraulic actuator 23 is a double-acting actuator, therefore it has two chambers 28 and 29 which are connected to the second branch 18 to be pressurized and displace the driving member 27 in opposite directions with respect to each other. However, in principle, the present invention can also be applied to single-acting actuators, namely with one single pressurized chamber, countered by a spring-loaded device, and possibly also to rotary hydraulic actuators.

The hydraulic system 1 further comprises a control valve 31, which is arranged along the second branch 18 for managing the operating liquid flow to and from the chambers 28 and 29, in order to cause the displacement of the driving member 27.

According to the present invention, the control valves 21 and 31 are defined by solenoid valves which are dimensionally and structurally identical to each other, even if they perform essentially different functions along the first branch 8 and along the second branch 18, respectively. Thanks to this dimensional and constructive identity, they simplify the design, the manufacturing and the assembly of the hydraulic system 1.

In particular, in the illustrated example, the control valves 21 and 31 are four-way, three-position valves. In other words, each of the control valves 21 and 31:

- solely has four ways, or ports, indicated by reference letters P, T, A and B, respectively, of which:
  - the port P is an inlet opening communicating in a permanent manner with the junction point 20 and thus with the delivery mouth 7, for receiving the operating liquid supplied by the pump 3,
  - the port T is a discharge opening, permanently in communication with the reservoir 2, the port A is an outlet opening which communicates with the nozzles 11 in the case of the control valve 21 on the first branch 8, or with the chamber 28, in the case of the control valve 31 on the second branch 18, and
  - the port B is a further opening, which is disconnected or communicates with the reservoir 2 in the case of the control valve 21 on the first branch 8, or communicates with the chamber 29 in the case of the control valve 31 on the second branch 18;
- has a valve body and a selector body 33, for example a drawer body, which is movable in the valve body so as to be able to assume three distinct positions and define the following communication steps between the ports P, T, A and B:
  - in the first position, the port P exclusively communicates with the port A, and the port T exclusively communicates with the port B;
  - in the second position, the port P is closed, and the port T communicates with both ports A and B;
  - in the third position, the port P exclusively communicates with the port B, and the port T exclusively communicates with the port A.

Preferably, the second position is intermediate between the first and the third positions, considering the stroke of the selector body 33 in the valve body.

The position of the selector body 33 is set by means of a suitable electrical control signal, which is sent to at least one actuator 35 provided for on the control valve 21,31. Each of the three positions described above corresponds to a respective value of the electrical control signal.

Preferably, each of the control valves 21,31 further comprises a spring-loaded positioning device 37, which brings the selector body 33 to a predetermined rest position in the absence of the electrical control signal. Preferably, the predetermined rest position coincides with the first position described above.

The control valves 21 and 31 are controlled by an electronic control unit 39, in a coordinated manner with respect to each other, in response to suitable input signals. Such input signals include a signal which is provided by a position sensor 41 configured to detect, preferably without contact, the position of the driving member 27. For example, the position sensor 41 is a Hall-effect sensor.

The electronic control unit 39 is configured, by means of suitable control strategies, to drive the control valves 21 and 31 in the following manner:

- in a standard operating condition (illustrated in FIG. 1), the actuator 23 does not have to be driven, therefore the control valve 31 is controlled so as to maintain its selector body in the second position, with the port P closed; therefore, the second branch 18 is not subject to any operating liquid flow rate, which instead goes completely into the first branch 8; at the same time, the chambers 28 and 29 are placed in discharge, both being in communication with the port T; furthermore, the control valve 21 is controlled so as to bring its selector body 33 in the first position, where the port P is connected to the port A, for supplying the nozzles 11;
- when the actuator 23 has to be driven, the control valve 21 is controlled so as to bring its selector body 33 in the second position, so as to close the port P and thus direct the operating liquid completely into the second branch 18; at the same time, the control valve 31 is controlled so as to bring its selector body 33 in the first position or in the third position, for pressurizing the chamber 28 or the chamber 29 (based on the direction to assign to the driving member 27).

Since the chambers 28 and 29 are placed in discharge in the standard operating condition, it is suitable to provide for a mechanical retention device, not shown, which exerts a holding force on the driving member 27 and/or on the movable element 24, so as to maintain the previously set position, and thus prevent vibrations or other undesired actions from displacing the movable element 24.

Preferably, the control valve 31 and the electrical control signal are of the proportional type, therefore in the displacement of the selector body 33 from the second position towards the first or the third position it is possible to adjust in a continuous manner the operating liquid flow rate supplied towards the corresponding chamber 28,29 of the hydraulic actuator 23, varying in a progressive manner the electrical control signal sent to the actuator 35 (for example, so as to be able to adjust the displacement speed of the driving member 27).

According to an embodiment, not shown, in the case where the hydraulic actuator 23 is a single-acting actuator, each of the control valves 21,31 could be simplified, and be of the three-way, two-position type (in practice, with respect to the embodiment illustrated in FIG. 1, the port B and the third position of the selector body 33, described above, could be absent).

According to a further embodiment, not shown, the hydraulic actuator 23 can be used to drive a locking device, for example of the hook type, for locking the rotation of an axle, for example a rear axle, so as to perform a stop and/or antitheft function when the motor vehicle is parked.

Based on what set forth above, the advantages of the hydraulic system 1 according to the present invention, as defined in the appended claims, result to be evident.

In particular, the hydraulic system 1 is relatively simple, as it allows adding an actuating function to a hydraulic circuit which is already normally provided for so as to cool and/or lubricate parts of a power transmission, utilizing a very contained number of components: in practice, besides the pipes for the second branch 18, it is only necessary to add the control valve 31, the hydraulic actuator 23 and the position sensor 41. Moreover, the control valve 31 results to be equal to the control valve 21, therefore it does not require dedicated supplies along the assembly lines.

Furthermore, the hydraulic system 1 can be utilized for different components on the motor vehicle and/or for different purposes: in the examples set forth above, it is utilized for driving a clutch device on the front axle and for driving a locking device on the rear axle. In general, it can be utilized for any application requiring an actuation associated with a power transmission. To this regard, an actuation of the hydraulic type will thus be obtained, integrated with the cooling and/or lubricating function, instead of having electrical actuations.

In other words, the hydraulic system 1 is extremely versatile, as it can be utilized for different applications, maintaining the same components described above.

Thanks to the simplification and flexibility obtained thanks to the hydraulic system 1, it is possible to reduce times and costs for the design, the manufacturing, the assembly, as well as the weight of the transmission.

Finally, it is clear that modifications and variations can be made to the hydraulic system 1 described with reference to FIG. 1, without thereby departing from the scope of protection of the present invention, as defined in the appended claims.

For example, the control valves could be of the rotary type, instead of being of the drawer type, and/or the nozzles 11 could be replaced by heat exchangers for solely performing a cooling function (without lubrication).

The invention claimed is:

1. A hydraulic system of a power transmission, comprising:

a reservoir;

a pump driven to supply an operating liquid from the reservoir;

a first branch and a second branch starting from a junction point; the first branch configured to perform a cooling and/or lubricating function on a part of the power transmission; the second branch ending at a hydraulic actuator to perform an actuating function;

control valves controlled by an electronic control unit to manage the operating liquid supplied by said pump;

characterized in that said control valves comprise:

a first control valve arranged along said first branch;

a second control valve arranged along said second branch;

wherein each of said first control valve and said second control valve comprises:

a first port connected to said junction point;

a second port connected to said reservoir;

a third port; the third port of said first control valve being connected so as to direct the operating liquid towards the part to be cooled/lubricated; the third port of said second control valve communicating with a chamber of said hydraulic actuator for pressurizing said chamber;

a selector body which is movable, in response to an electrical control signal, between a first position and at least a second position, wherein a) in the first position, the first port communicates with the third port; and b) in the second position, the first port is closed, and the second port communicates with the third port, wherein each of said first control valve and said second control valve further comprises a fourth port; the fourth port of said first control valve being disconnected or being in communication with said reservoir; the fourth port of said second control valve communicating with a further chamber of said hydraulic actuator for pressurizing said further chamber; wherein, in the second position, the second port communicates with the third port and with the fourth port; and wherein the selector body is movable also in a third position, in which the first port communicates with the fourth port, and the second port communicates with the third port-(A).

2. The hydraulic system according to claim 1, wherein said hydraulic actuator is a double-acting linear actuator.

3. The hydraulic system according to claim 1, wherein the second position is intermediate between said first and third positions along a displacement stroke of said selector body.

4. The hydraulic system according to claim 1, wherein each of said first control valve and said second control valve is a four-way, three-position valve.

5. The hydraulic system according to claim 1, wherein each of said first control valve and said second control valve is a proportional valve.

6. The hydraulic system according to claim 1, wherein each of said first control valve and said second control valve comprises a spring-loaded positioning device configured to bring said selector body to a predetermined rest position in the absence of the electrical control signal; the predetermined rest position coinciding with the first position.

7. The hydraulic system according to claim 1, wherein said hydraulic actuator drives a movable element forming part of a vehicle axle.

8. The hydraulic system according to claim 7, wherein said hydraulic actuator drives a clutch device forming part of said vehicle axle.

9. The hydraulic system according to claim 7, wherein said hydraulic actuator drives a locking device forming part of said vehicle axle.

* * * * *